F. A. LITTLEFIELD.
STEAM TRAP AND VALVE THEREFOR.
APPLICATION FILED MAR. 3, 1913.
1,156,032.
Patented Oct. 5, 1915.
2 SHEETS—SHEET 2.
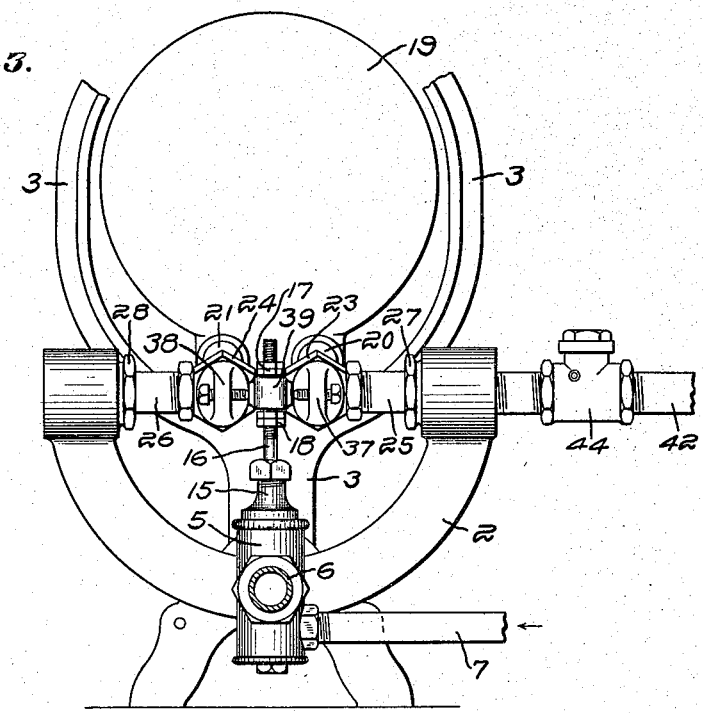
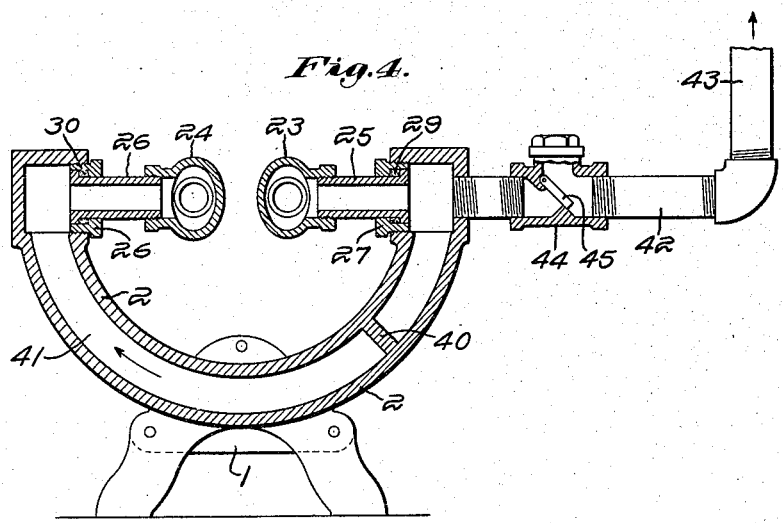
Witnesses:
Carl L. Choate.
Horace A. Crossman.
Inventor:
Frank A. Littlefield,
by Emery, Booth, Janney & Varney
Attys.

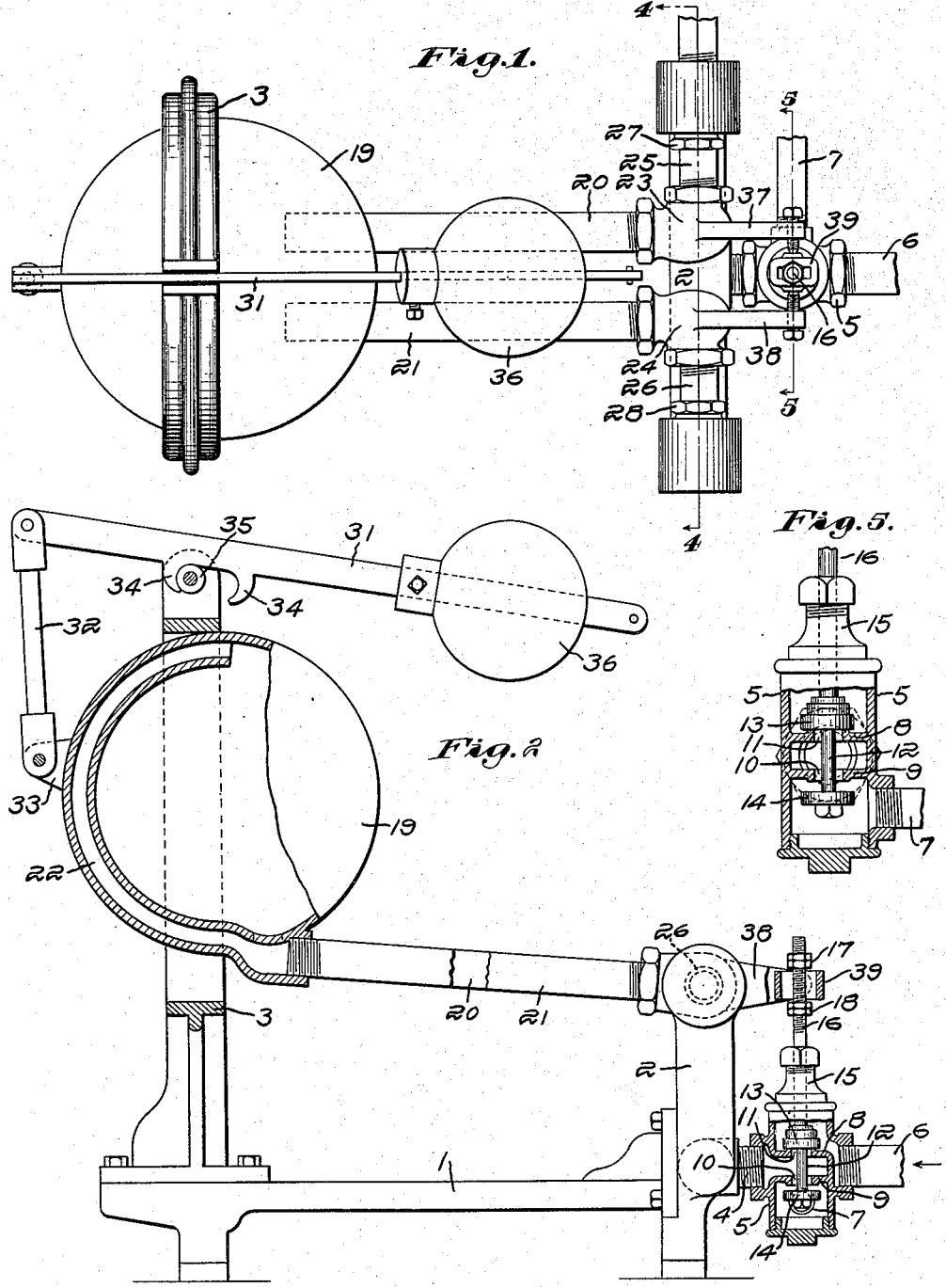

UNITED STATES PATENT OFFICE.

FRANK A. LITTLEFIELD, OF NASHUA, NEW HAMPSHIRE, ASSIGNOR TO NASHUA MACHINE COMPANY, OF NASHUA, NEW HAMPSHIRE, A CORPORATION OF MAINE.

STEAM-TRAP AND VALVE THEREFOR.

1,156,032.  Specification of Letters Patent.  Patented Oct. 5, 1915.

Application filed March 3, 1913. Serial No. 751,738.

*To all whom it may concern:*

Be it known that I, FRANK A. LITTLEFIELD, a citizen of the United States, and a resident of Nashua, in the county of Hillsboro and State of New Hampshire, have invented an Improvement in Steam-Traps and Valves Therefor, of which the following description, in connection with the accompanying drawings, is a specification, like characters on the drawings representing like parts.

This invention relates to valves adapted for use in various relations, but particularly adapted for use in connection with steam traps of various types. The invention also relates to combined steam traps and valves as hereinafter set forth.

In order that the principle of the invention may be readily understood, I have disclosed a single embodiment thereof in the accompanying drawings, wherein—

Figure 1 is a plan view of an illustrative steam trap to which the valve of my invention may be applied; Fig. 2 is a side elevation, partially in section, of the trap and valve shown in Fig. 1, and constituting the preferred embodiment of my invention. Fig. 3 is an end elevation of the construction shown in Fig. 1, parts being broken away; Fig. 4 is a vertical section taken on the line 4—4 of Fig. 1; and Fig. 5 is a detail in vertical section showing the valve on a larger scale, on the line 5—5 of Fig. 1.

Referring more particularly to the drawings, the illustrative steam trap with which I have herein represented the valve of my invention as associated, comprises a frame including a tripod 1 for supporting the various parts of the trap and a segmental ring 2 and an entire ring 3 rising from the tripod adjacent opposite ends thereof. The segmental ring 2 is hollow, as most clearly shown in Fig. 4. At a suitable point, and preferably about midlength thereof, the said ring 2 is provided with an externally threaded inlet pipe section 4 onto which is suitably fitted a valve casing 5, through valve controlled passages in which both the steam and the water of condensation are admitted as hereinafter set forth.

The valve casing 5 has fitted thereto opposite the pipe 4 a steam inlet pipe 6, and between the pipes 4 and 6, a water inlet pipe 7 represented most clearly in Fig. 1 and Fig. 3, and constituting the inlet for the water of condensation from the boiler. The valve casing is provided with transverse partitions 8, 9 apertured at 10, 11 to provide valve seats.

Mounted within the valve casing is a valve stem 12 having thereon an upper valve disk 13 and lower valve disk 14 respectively controlling the valve ports 10, 11. The valve stem 12 extends upwardly through the valve casing 5 and through a suitable bonnet 15, and is preferably threaded as indicated at 16 for the reception of nuts and lock nuts 17, 18 for coöperation with the steam trap, as herein more fully set forth.

Assuming that the valve is to be used in connection with a steam trap, it is obvious that the latter may be of any suitable type. In the several figures, I have represented a bowl 19, which is provided with a pair of tubes 20, 21, the former constituting a water outlet and the latter constituting in alternation a water inlet and a steam inlet. The pipe 21 communicates with a duct 22 which may be cast in the wall of the bowl and having an outlet communicating with the interior of the bowl at the top thereof, said duct acting in alternation as a steam duct and as a water duct.

The pipes 20, 21 are provided with elbow pipes 23, 24 having trunnion tubes 25, 26 journaled in bearings 27, 28 threaded into the segmental ring 2 at the ends thereof, as indicated most clearly in Fig. 4. By this arrangement the bowl 19 may tilt for filling and for emptying the same. The trunnion tubes 25, 26 and the bearings 27, 28 are provided with flanges between which are confined packing rings 29, 30.

The tilting of the bowl 19 is preferably governed by means of a weighted lever 31 connected by a link 32 with an ear 33 on the said bowl. In the particular form of weighted lever and link connection shown, the operation of the trap is rendered desirably prompt and actively responsive to predetermined conditions of water in the bowl 19 by an arrangement of leverage changing device consisting of an elongated bearing for the lever 31 formed by fingers 34 projecting from said lever and constituting between them a bearing engaging a roller 35 on the frame. When the bowl 19 is in its up-position, as shown in Fig. 2, the left hand finger 34 engages the roller 35. When the bowl tilts downward, the rocking of the lever 31 will lift the weight 36 thereon, and causes the lever to slide in the direction of its length to bring its other finger 34 against the roller 35, thereby increasing the effective leverage of the bowl 19 on the lever weight. It is, however, obvious that any other suitable means may be provided to co-operate with the bowl 19 in effecting the proper tilting thereof.

In order that the accumulated water in the bowl 19 may be utilized to control the valve hereinbefore referred to, I have provided suitable mechanism for operating said valve by the movement of the bowl. To this end, I have herein represented the elbow tubes 23, 24 as provided with ears 37, 38 projecting therefrom. These ears are apertured to receive the journaled ends of a suitable cross head or other device 39 loosely receiving the valve stem 16 between the nuts 17, 18 thereon. If desired, the upper nuts may be set somewhat above the cross head 39 to permit a slight play and to enable the bowl to tilt somewhat before bringing the cross head 39 into engagement with said upper nuts. By this arrangement the bowl acquires a certain momentum and effective force before it becomes active in lifting the valve disk 13 from its seat.

The hollow segmental ring 2 is provided with a partition 40, thereby forming a duct 41 leading from the inlet pipe section 4 and through which in alternation the water of condensation and the steam are admitted and pass in the direction of the arrow in Fig. 4.

In that application of my invention herein represented, the upper, right hand end of the segmental ring pipe 2 (viewing Figs. 3 and 4) is tapped to receive a water outlet pipe 42 which communicates with any suitable tank through the pipe 43. The pipe 42 is provided with a suitable valve casing 44 having therein a check valve 45 opening toward the tank and preventing the back flow of water therefrom.

The operation of the valve as applied to the steam trap herein represented is as follows. It may be supposed that the bowl 19 is in its up-tilted position being held there by its weighted lever 31. When in this position the valve disk 13 is held closed by the pressure of the steam which enters through the steam inlet pipe 6 and fills the valve casing above the valve 13 and the partition 8. The steam does not pass beyond the valve disk 13 until the bowl 19 fills. The valve disk 14 is depressed or open, and therefore the water of condensation entering through the inlet pipe 7 passes through the orifice in the partition 9 into the space between the partitions 8 and 9, and then entering the pipe section 4 and the duct 41 of the segmental ring 2, passes through the trunnion pipe 26 and elbow pipe 24 and thence through the pipe 21 into the steam trap 19. When sufficient water of condensation accumulates in the bowl 19, it will overcome the counterbalance weight and cause the bowl to tilt downward. In that application of my invention herein shown, this movement is accelerated by the automatic change in the leverage of the weighted lever 31 in sliding on its fulcrum roller 35. The initial tilt of the bowl rocks the cross head 39 up into engagement with the upper nuts 17 on the valve stem 16, taking up the play between them. Further tilting of the bowl snatches the valve disk 13 quickly and positively from its seat and permits live steam to pass through the steam pipe 6 past the valve disk 13 and thence into the pipe 21 and finally through the steam duct 22 into the bowl 19 above the water of condensation therein. The steam entering the bowl 19 through the steam duct 22 compels the discharge of the water of condensation from the said bowl through the pipe 20, the elbow 23, the trunnion 25 and the outlet pipes 42, 43 to any suitable tank, the check valve 45 preventing the return of the water of condensation to the trap.

The means for operating the single valve mechanism or means herein disclosed may be widely varied within the scope of the invention. It will be observed that the single valve means having the two disks 13, 14 controls the admission both of the water of condensation and of the steam. Not only is the structure very greatly simplified, but the parts will operate successfully with any pressure, a result not heretofore obtainable in any steam trap so far as I am aware.

Having thus described one illustrative embodiment of my invention, I desire it to be understood that although specific terms are employed, they are used in a generic and descriptive sense and not for purpose of limitation, the scope of the invention being set forth in the following claims.

Claims:

1. A steam trap comprising in combination, a movable bowl, counterweighting means therefor, admission means for the water of condensation and steam, a reciprocatory valve stem having valves controlling the flow of water of condensation and steam, and an operating connection between the bowl and said valve stem, whereby the latter is operated by movement of the bowl, and outlet means for the water of condensation.

2. A steam trap having in combination, a bowl support and provided with a steam inlet and an inlet and outlet for water of condensation, two pipes pivoted upon said support and in communication with said inlets and outlet, a bowl mounted upon and in communication with said pipes, and a duplex valve operated by pivotal movement of said bowl, and controlling the flow of steam and water of condensation, through said inlets and outlet.

3. A steam trap comprising in combination, a bowl support having a steam inlet and an inlet and outlet for water of condensation, two pipes pivoted upon said support, one constituting a water outlet and the other constituting a water and steam inlet, a bowl mounted upon and in communication with said pipes, and a duplex valve operated by tilting movement of said bowl and controlling the water and steam flow through said pipes.

4. A steam trap comprising in combination, a bowl support having a steam inlet and an inlet and outlet for water of condensation, two pipes pivoted upon said support, one constituting a water outlet and the other constituting a water and steam inlet, a bowl mounted upon and in communication with said pipes, and a reciprocatory valve stem operatively connected with and moved by tilting movement of said bowl, said valve stem having two valves controlling the flow of steam and water through said pipes.

5. A steam trap comprising in combination, a bowl support having a steam inlet and an inlet and an outlet for water of condensation, two pipes pivoted upon said support, one constituting a water and steam inlet and the other constituting a water outlet, a bowl mounted upon and in communication with said pipes, and a single valve means operatively connected with and actuated by tilting movement of said bowl to control the flow of water and steam through said pipes.

6. A steam trap comprising in combination, a support having a steam inlet and an inlet and outlet for water of condensation, two pipes pivotally mounted upon said support, one constituting a water and steam inlet and the other constituting a water outlet, a bowl mounted upon and in communication with said pipes and a single valve means operated by movement of said bowl to effect the alternate inlet of steam and water of condensation through one of said pipes and the outflow of water of condensation through the other of said pipes.

7. A steam trap comprising in combination, a bowl support having a steam inlet and an inlet and outlet for water of condensation, a bowl mounted for to and fro movement upon said support and having two pipes in communication therewith and with said support, one of said pipes constituting a water and steam inlet and the other constituting a water outlet, and a single valve means operated by the to and fro movement of said bowl and operatively connected therewith, said valve means controlling the flow of steam and water through said pipes.

8. A steam trap comprising in combination, a bowl support having a steam inlet and an inlet and outlet for water of condensation, a bowl mounted for to and fro movement upon said support and having two pipes in communication therewith and with said support, one of said pipes constituting a water and steam inlet and the other constituting a water outlet, and a valve stem operatively connected with said to and fro movable bowl and provided with a plurality of disks controlling the flow of water and steam through said pipes.

9. A steam trap comprising in combination, a bowl support having passages therein, a valve casing attached to said support and having a steam inlet and an inlet and outlet for water of condensation, a duplex partition in said valve casing, a single valve stem having two disks controlling the flow of water and steam through said partitions, a bowl mounted for to and fro movement upon said support, two pipes respectively communicating with said pipe and said bowl, one constituting a water and steam inlet and the other constituting a water outlet, and an operative connection between said bowl and said valve stem, whereby the latter is operated by the filling and emptying movement of said bowl.

10. A steam trap comprising in combination, a to and fro movable bowl, counterweighting means therefor, admission means for the water of condensation and steam and outlet means for the water of condensation, and a single valve means operated by the to and fro movement of said bowl to admit in alternation water of condensation and steam to said bowl and to permit the outflow of water of condensation from said bowl.

11. A steam trap comprising in combination, a to and fro movable bowl, counterweighting means therefor, admission means for the water of condensation and steam and outlet means for the water of condensation, and a single reciprocatory valve means operated by the to and fro movement of the bowl and controlling the alternate admission of water of condensation and steam to the bowl and the outflow of water of condensation therefrom.

In testimony whereof, I have signed my name to this specification, in the presence of subscribing witnesses.

FRANK A. LITTLEFIELD.

Witnesses:
L. B. ARCHER,
MARSHALL D. COBLEIGH,
C. J. HAMBLETT.